Sept. 1, 1931.  S. HILLER  1,821,639
RENDERING PROCESS
Filed May 26, 1925
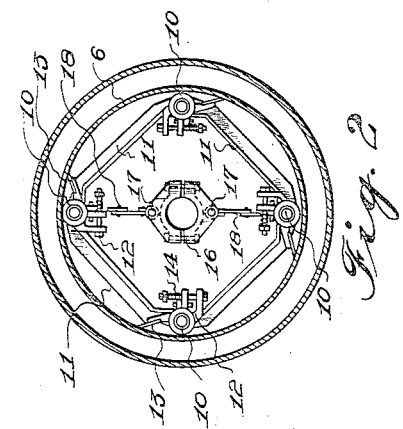
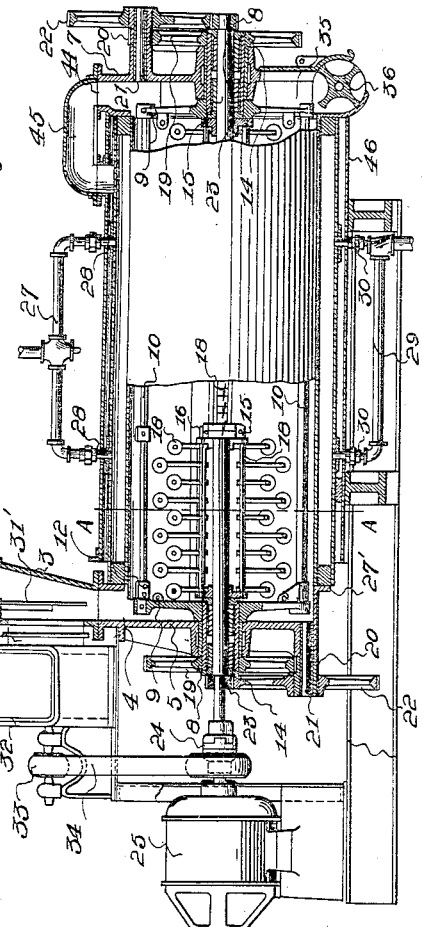
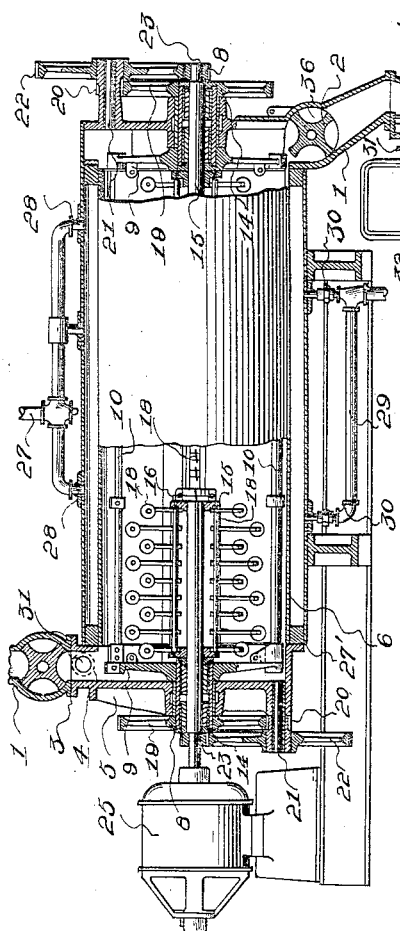
Inventor
Stanley Hiller
By William A. Strauss
Attorney Patented Sept. 1, 1931

1,821,639

UNITED STATES PATENT OFFICE

STANLEY HILLER, OF OAKLAND, CALIFORNIA

RENDERING PROCESS

Application filed May 26, 1925. Serial No. 32,952.

The present invention relates to novel processes for rendering oil and fat containing solids such as fish, fish waste, animal fats, meat scrap, packinghouse offal, seeds, coconuts, olives, nuts, garbage, and the like.

More particularly the invention relates to a continuous process of rendering materials of the character mentioned by use of a continuous pressure and high temperature sterilizing and disintegrating unit, and a low temperature dehydrating unit in combination with a continuous press. The materials to be rendered are preferably passed continuously through a sterilizing and disintegrating unit in which they are subjected to the action of steam under pressure until thorough sterilization has been effected. The steam pressures are preferably developed from the natural moisture content of the materials to be rendered by heating in a jacketed retort to avoid so far as possible addition of moisture to the materials. Due to the action of the steam pressure on the materials and preferably an additional mechanical dividing action, disintegration of the oil bearing cellular structure may be effected and a large percentage of the fats may be freed in this manner. Relatively large particles of bone may be passed into the sterilizing and digesting unit and reduced to a digested and disintegrated condition under suitable pressure conditions. The passage of the material through the sterilizing and digesting unit is controlled so that the necessary sterilization and desired degree of disintegration is attained; and the digested and sterilized material is then passed continuously into and through a low temperature dehydrating and disintegrating unit whereby the material is heated to complete the rendering thereof and to condition the solid residue for continuous expressing.

To effect satisfactory continuous pressing in a high pressure screw press I have discovered that the moisture content of the solid residue must be reduced below 20 per cent and preferably to the range of 5 to 15 per cent. As the materials come from the sterilizing unit the moisture in the solid residue may be considerably above 20 per cent; and the fats are of high quality. By completing the dehydration and rendering at relatively low temperatures the process is speeded and the advantages of my prior vacuum dry rendering system disclosed in copending application S. N. 32,953 filed May 26, 1925, and my Patent #1,735,392, dated November 12, 1929, are retained while sterilized and improved grades of fats and oils are produced.

A preferred form of apparatus for carrying out my invention is disclosed in the accompanying drawings of which Figure 1 is a side elevation partially in section showing the preferred form of sterilizing and dehydrating units in combination.

Figure 2 is a section taken along line AA of Figure 1.

Figure 3 is an end view of the discharge end of the dehydrating plant which is similar to the corresponding end of the sterilizing and disintegrating unit except as hereinafter noted and to which reference is made in the description of the sterilizing and disintegrating unit.

The materials to be rendered are fed through hopper 1 of the sterilizing and disintegrating unit to a valve 2 which is driven continuously in any suitable manner to deliver the materials at a predetermined and controlled rate through feed passage 3 and at the same time a mechanical pressure seal is continuously maintained by the valve. From passage 3 the material drops through a passage 4 into the feed end casting or head 5 of the apparatus. A cylinder 6 is supported at one end in and communicates with head or casting 5, and at its other end the cylinder 6 is supported in and communicates with a discharge head or casting 7. Journaled in the heads 5 and 7 are drive sleeves 8 which are secured to the lifter supporting spiders 9. Supported in and connecting the spiders 9 into a rigid cage or structure are rods 10 which extend through the cylinder 6 and are spaced apart and strengthened by members 11. Supported and journaled at spaced points along the rods 10 adjacent the strengthening members 11 are spider supporting members 12 on which are supported the scraping, wiping, or lifting bars 13. Springs 14 seated between extensions or shoulders of members 11 are arranged to force the members 12 about the rods 10 until the wipers or lifters 13 engage the interior surface of cylinder 6. Sets of bushings 14' are provided inside of the sleeves 8, and journaled for rotation in these bushings is a high speed beater or hammer shaft 15 extending through the cylinder 6. Supported within the cylinder 6 on the shaft 15 by means of split collars 16 and the diametrically spaced rods 17 are a series of adjacent pivoted hammers or beaters 18 arranged in spaced sections. The adjacent sections of pivoted hammers or beaters are arranged so that when shaft 15 is rotated alternate pairs of the hammers will extend at right angles to each other to effect the advance of the materials through the cylinder 6, the hammers or beaters are preferably given a slight angle or inclination so that as the material is struck it is thrown slightly forward. The feed may however be effected by inclining the cylinder or giving the bars 13 a slight helical twist, or any combination of these expedients may be utilized.

Sleeves 8 have secured thereto and are driven by spur gears 19 at each end of the unit, and gears 19 mesh with and are driven by pinions 20. Pinions 20 are integral with and driven by spur gears 22. Gears 22 are in turn driven by pinions 23 which are rigidly secured to and rotatable with the beater shaft 15. Beater shaft 15 is driven through a clutch similar to clutch 24 for the dehydrating unit by a suitable motor 25 or in any other desired manner.

The cylinder 6 is heated by means of a jacket preferably formed by enclosing it in a concentric cylinder 27 which is spaced away from cylinder 6 by suitable mud rings 27' which form the ends of the heating jacket. For rapid and effective sterilization steam under pressures up to 100 pounds per square inch or more is circulated through the jackets by means of inlet connections 27" and 28 and outlet connections 29 and 30. Because of the rapid heating and evaporating actions in the sterilizing and disintegrating unit, steam will be generated from the moisture content of the material. Some of the generated steam will pass out in the feed and discharge valve pockets, and the excess steam generated over and above that required for sterilization may be exhausted through opening 31 in the passage 4. Opening 31 may be throttled in any suitable manner to cause the steam pressure to build up in this unit, preferably by a slowly rotating valve to allow excess pressure to escape periodically.

The materials are passed through the cylinder 6 continuously as the sterilization and disintegration proceeds and are discharged through the outlet 35 in the discharge head 7 into a continuously rotating discharge valve 36. The valve 36 is provided with pockets and maintains a mechanical seal against the admission of cold air when only one unit or still is utilized as the material is discharged. Valve 36 is driven by means of a shaft corresponding to shaft 37' for the dehydrating unit which in turn is driven by a sprocket corresponding to sprocket 38' of the dehydrating unit secured thereto, chain corresponding to chain 39' of the dehydrating unit and a sprocket corresponding to sprocket 40' of the dehydrating unit all as clearly indicated in Figure 3. The sprocket 40' is mounted on and driven by a spindle 41' which in turn is driven by a pinion 42'. The pinion 42' is rotated at its proper relative speed by means of the spiral drive members or teeth 43' (Fig. 3) carried on the gear 19 at the discharge end of the unit.

The unit so far described comprises the preferred form of pressure sterilizing and disintegrating unit. It will, however be understood that a pressure sterilizing and disintegrating unit such as is disclosed in copending application S. N. 32,953 filed May 26, 1925, may be substituted for the form shown.

The discharge valve 36 acts as the feed valve for the low temperature dehydrating and sterilizing unit which comprises a fixed steam jacketed cylinder, high speed beaters or hammers and low speed lifters or wipers as shown and described in connection with the sterilizing unit. Like parts of the dehydrating unit have been given the same reference numerals as are applied to the sterilizing unit parts, except that the reference numerals designating the successive parts of the dehydrating unit corresponding to the successive parts of the sterilizing and disintegrating unit have been primed or double primed where similar numerals are primed in the sterilizing and disintegrating unit, and a full understanding of these parts will be had by reference to the corresponding description of the sterilizing unit above given since the mechanical construction and operation is substantially the same in both units.

Vapors and moisture evolved in the dehydration unit are withdrawn through the inlet passage 4', past baffle plate 31' arranged to cause the deposit of any suspended solid particles and through outlet passage 31' by means of an exhaust fan or pump 32 which is driven by a pulley 33 and belt 34 from motor 25'. By closing the opening 44 of the discharge head 7 with a suitable cover plate 44' such as is shown, covering this opening in the sterilizing and disintegrating unit, the dehydration may be carried out in a vacuum with air excluded. However the temperature of the fats may be maintained so low that oxidation of the fats and oils may be avoided and the dehydrating action is speeded, by drawing large volumes of dry heated air through the dehydrator unit. This may be effectively carried out by connecting the opening 44 by duct or conduits 45 to an air heating jacket formed by an encasing cylinder 46 which surrounds the jacket cylinder 26 and is closed at the discharge end of the unit, but open to atmosphere at the feed end. In operation large volumes of air are drawn between the outside of the jacket cylinder 26 and the inside of the cylinder 46. This air is heated and then drawn in large volumes through the cylinder 26 of the dehydrator from the discharge end to the feed end by the action of the fan 32 and is contacted with and aids in the rapid dehydration of the materials.

*Operation*

In operation the materials are reduced or cut to a suitable size to be handled by the valves, or smaller if desired, and if dirty are washed, and are then fed continuously into the sterilizing and dehydrating units by means of valves 2 and 36. The beaters or hammers 18 and 18′ are of suitable size and weight for the particular material being handled and are preferably provided with a slightly inclined striking face to feed the materials forward as the hammers are rotated. The hammers or beaters are rotated at speeds of from several hundred revolutions a minute and upward in accordance with the particular material being treated and the hammers will fly out radially about their individual pivots. As the material drops into the cylinder it is splashed or dashed by the hammers or beaters against the heated walls of the cylinder 6. Wiping or lifting members 13 and 13′ are rotated at relatively low speeds which usually range from 10 to 20 or more revolutions per minute. The relative speeds of the wipers or lifters should be such that the material is lifted and permitted to drop through the cylinder into the path of the beaters or hammers to be struck, dashed, and spread against the heated cylinder 6 in a thin, rapidly changing layer with the material being advanced continuously through the cylinder from the feed to the discharge end. The rate of feeding material through the valves 2 and 36 is timed so that the proper amount of material is in the cylinder 6 to maintain the proper continuous operation of the unit. The heating action of the cylinder vaporizes the moisture content of the material and rapidly generates steam. The natural moisture content of materials such as fat-and-oil-containing animal and fish parts is ample to generate sufficient sterilizing and digesting pressures, and steam under pressure ranging up to 60 or more pounds per square inch depending upon the nature of the materials to be treated is maintained continuously in the sterilizing and digesting unit by increasing the withdrawal of generated vapors through the vapor outlet in obvious manner, while pressures as high as 100 pounds per square inch or more, but preferably ranging from 40 to 80 pounds may be maintained in the heating jackets. For rendering certin grades of fish, such as herring, menhaden, and the like, the pressures of approximately 5 pounds per square inch may be utilized but for the disintegration and sterilization of heavy boned fish as salmon and for the handling of animal fats and dead animal parts, pressures of 30 to 60 pounds per squre inch and upwards are preferably utilized.

As the material advancing through the cylinder has the solid structure thereof shattered as it is dashed from the beaters against the walls of the cylinders, wiped or scraped from the cylinder walls, lifted through the cylinder and dropped back to the hammers and mixed in rapid succession. The repeated heating, beating, impacting, mixing, shattering and dividing actions continue as the material advances through the cylinder, until it is discharged from the valve 36 sterilized and disintegrated to the desired extent and with the solid contents thereof in a finely divided state. As the materials are discharged from the sterilizing unit valve 36 they comprise a mass of free hot oils and fats, and disintegrated solids. The free hot fats and oils may be drained away from the solids and the solids then passed into the dehydrating unit, or the entire mass may be passed directly into the dehydrator unit and further treated. When the fats are to be drained away at this stage a drain conveyor with a screen bottom such as the press feed conveyor which is shown in Patent No. 1,518,926, issued Dec. 9, 1924, and as shown at 46, may be interposed between the sterilizing unit and the dehydration unit, and a feed valve the same in construction as feed valve 2 may be added to the dehydrator unit.

The dehydrator jacket is heated by steam pressure which will ordinarily be maintained at about 10 pounds per square inch. The action of the beaters and wipers in maintaining a thin rapidly changing layer of the material on the dehydrator cylinder surface is the same as set forth for the sterilizing unit, and in addition the material is intimately contacted with heated air in large volumes if the air connection is utilized. The material is further disintegrated, and dehydrated as it passes through the unit, and the evolved gases and vapors, together with the heated air currents when used, are withdrawn continuously by the action of fan 32 through outlet 31′. If vacuum operation in the dehydrator unit is desired, opening 44 may be closed by removing duct 45 and fastening a cover plate over opening 44 whereby said opening is closed and fan 32 is operated to withdraw the evolved gases and to maintain the desired degree of vacuum.

The treatment in the dehydrator unit is carried out so that as the material is discharged the moisture content of the solid residue is reduced below 20 per cent and is preferably in the range of 5 to 15 per cent so that the fats and oils may be expressed therefrom in a continuous screw press. The material as discharged from the dehydrator valve 36' comprises a mixture of free hot fats and oils, and solid residue or cracklings, and this mixture is passed continuously to a screw press by a drain conveyor and press 46 such as is shown in my U. S. Patent No. 1,518,926, issued December 9, 1924. In the press feed conveyor the free hot fats and oils are drained away and the solid residue passes into a high pressure continuous press where it is continuously expressed to remove a substantial percentage of the fats and oils remaining in the solids. Pressures of five hundred or more pounds per square inch are developed in the press. The cake from the press is ground into a meal to be utilized as or in the preparation of stock food or fertilizer. Meals of higher water solubility, lower fiber content, lower fat percentage and higher availability are produced in this way than are produced from the residue in the usual dry rendering process.

By way of specific example I have found in treating edible animal fats in the manufacture of lard, if the fats are fed through valve 2 in relatively large pieces as they come from the cutting and trimming operations in a packing house, steam pressures of approximately 30 pounds per square inch and the beating and mixing action for a period of approximately five minutes are desirable to partially render, sterilize and disintegrate the fats in the sterilizing unit but it will be understood that longer treatments at higher steam pressure may be given without injury. The sterilized and partially rendered fats pass continuously into the dehydrating unit, on which jacket steam pressures of 10 pounds per square inch are preferably maintained, and the dehydrator unit is so proportioned and operated that the moisture content of the solid residue in the materials is reduced below 20% as it passes out of valve 36. A treatment of five to ten minutes in the dehydrator unit is sufficient to accomplish the desired further degree of rendering and dehydration in practice. The passage of air through the materials in the dehydrating unit it is to be noted, results in partial aeration of the fats as well as increasing the speed of the drying operation.

When animal offal containing hard animal bones is treated, the materials are preferably ground mechanically before being passed into the sterilizing unit, and it will be understood that the length of sterilizing treatment, the pressures by which sterilization and rendering proceeds, and the dehydration period are suitably increased, the treatment for each material being varied as will be well understood by those skilled in the art, in accordance with its nature, the amount of bone present, and the size of the pieces fed into the digesting unit.

In rendering materials in which sterilization is unimportant as for example in handling fresh herring or menhaden, which are relatively soft, the sterilization may be eliminated, and the rendering may be carried out in a combination of apparatus utilizing the dehydration in combination with the press feed conveyor and press. Air is preferably passed through the dehydrator in this case, and the oil may be sterilized by heating after separation if desired.

Having thus described a preferred embodiment of my invention, what is desired to be secured by Letters Patent and claimed as new is:

1. In a continuous process of rendering fat containing solid materials in two stages, the step of continuously mechanically dividing and simultaneously digesting the same with steam pressures substantially above atmospheric pressures to melt fats and oils from the solid materials in the first stage, and continuously dehydrating the digested materials by applied heat at atmospheric pressures in the second stage until the solids contained therein have a moisture content below 20%, said steam pressures being developed from moisture, naturally contained in the materials.

2. In a process of rendering fat and oil containing solid materials, the steps of continuously impacting the materials and advancing the same through a heated zone, under steam pressure developed from the moisture naturally contained in the material, and contacting the resulting mixture of solids, liquids and fats with currents of heated air for dehydrating the material as the impacting proceeds.

3. In a process of rendering fat and oil containing solid materials, the steps of continuously feeding the material into an enclosed space with heated walls under steam pressure developed from the moisture in the material itself, impacting the material against said walls, quickly removing same from said walls into said space, repeating the impacting and removing steps in rapid succession, advancing the resulting mixture of solids, liquids and fats continuously through said space in a manner to maintain a relatively thin rapidly changing layer on said walls, continuously discharging the resulting rendered material from said space, and continuously subjecting said rendered material to heated currents of air.

4. In a process of treating fat and oil containing solid material, the steps of sterilizing and disintegrating said material continuously in an enclosed space at high temperature and with steam pressure developed from the moisture content of said material, and continuously subjecting the resulting material to heated currents of air in an enclosed space for dehydrating said material.

In testimony whereof, I affix my signature.

STANLEY HILLER.